US011933079B2

(12) United States Patent
Schiffer et al.

(10) Patent No.: US 11,933,079 B2
(45) Date of Patent: Mar. 19, 2024

(54) DOOR LOCK, IN PARTICULAR MOTOR VEHICLE DOOR LOCK

(71) Applicant: Kiekert AG, Heiligenhaus (DE)

(72) Inventors: Holger Schiffer, Meerbusch (DE); Michael Scholz, Essen (DE); Thomas Schönenberg, Burscheid (DE); Ömer Inan, Dorsten (DE); Peter Szegeny, Engelskirchen (DE)

(73) Assignee: Kiekert AG, Heiligenhaus (DE)

( * ) Notice: Subject to any disclaimer, the term of this patent is extended or adjusted under 35 U.S.C. 154(b) by 230 days.

(21) Appl. No.: 17/610,726

(22) PCT Filed: May 14, 2020

(86) PCT No.: PCT/DE2020/100412
§ 371 (c)(1),
(2) Date: Nov. 12, 2021

(87) PCT Pub. No.: WO2020/228910
PCT Pub. Date: Nov. 19, 2020

(65) Prior Publication Data

US 2022/0220780 A1 Jul. 14, 2022

(30) Foreign Application Priority Data

May 14, 2019 (DE) ..................... 10 2019 112 525.1

(51) Int. Cl.
*E05B 77/04* (2014.01)
*E05B 77/36* (2014.01)
*E05B 85/26* (2014.01)

(52) U.S. Cl.
CPC ............. *E05B 77/04* (2013.01); *E05B 85/26* (2013.01)

(58) Field of Classification Search
CPC .......... E05B 77/00; E05B 77/02; E05B 77/04; E05B 77/36; E05B 79/08; E05B 79/10;
(Continued)

(56) References Cited

U.S. PATENT DOCUMENTS

2016/0108647 A1* 4/2016 Scholz .................... E05B 79/10
292/195
2017/0051540 A1* 2/2017 Okeke ..................... E05B 85/26
(Continued)

FOREIGN PATENT DOCUMENTS

CN 106468116 A 3/2017
DE 102005016488 A1 10/2006
(Continued)

OTHER PUBLICATIONS

First Office Action dated Nov. 2, 2022, for corresponding Chinese Patent Application No. 202080050761.1.
(Continued)

*Primary Examiner* — Jason D Shanske
*Assistant Examiner* — Daniel M. Keck
(74) *Attorney, Agent, or Firm* — Renner, Otto, Boisselle & Sklar, LLP

(57) ABSTRACT

A door lock, in particular a motor vehicle door lock, comprising a locking mechanism consisting substantially of a catch and at least one pawl. Each locking mechanism component is mounted on a base in a rotatable manner about an axis. Additionally, a fixed support body is provided for at least one locking mechanism component. According to the invention, the locking mechanism component is designed to be rotatable about a bearing pin at a distance from the support body during a normal operation and comes into contact with the support body solely in the event of a crash with a simultaneous deformation of the bearing pin.

9 Claims, 1 Drawing Sheet

(58) Field of Classification Search
CPC .......... E05B 79/18; E05B 85/20; E05B 85/24; E05B 85/26
See application file for complete search history.

(56) References Cited

U.S. PATENT DOCUMENTS

| | | | | |
|---|---|---|---|---|
| 2019/0003212 | A1* | 1/2019 | Steffen | E05B 85/243 |
| 2022/0003023 | A1* | 1/2022 | Eichel | E05B 77/36 |

FOREIGN PATENT DOCUMENTS

| | | | | | |
|---|---|---|---|---|---|
| DE | 102009029023 | A1 | | 3/2011 | |
| DE | 102009048222 | A1 | | 4/2011 | |
| DE | 202014105876 | U1 | * | 3/2015 | E05B 17/0062 |
| DE | 102016215336 | A1 | | 3/2017 | |
| DE | 102015122587 | A1 | | 6/2017 | |
| KR | 10-2022-0005078 | | * | 1/2022 | |

OTHER PUBLICATIONS

International Search Report dated Aug. 3, 2020, for priority International Patent Application No. PCT/DE2020/100412.

* cited by examiner

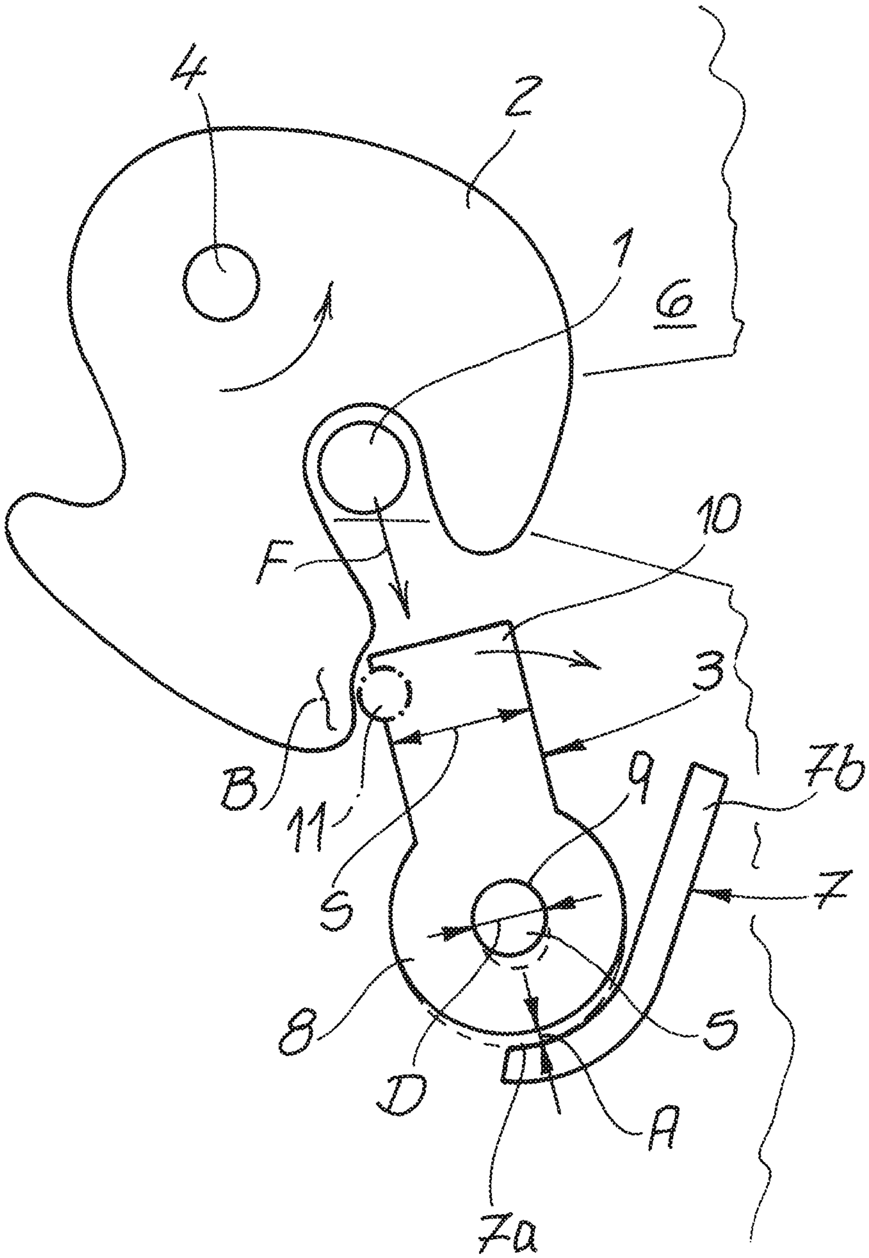
4
2
1
6
F
10
3
B
11
S
9
7b
7
8
5
D
A
7a

DOOR LOCK, IN PARTICULAR MOTOR VEHICLE DOOR LOCK

This application is a national phase of International Application No. PCT/DE2020/100412 filed May 14, 2020, which claims priority to Germany Application No. 10 2019 112 525.1 filed May 14, 2019, the entire disclosures of which are hereby incorporated by reference.

FIELD OF DISCLOSURE

The invention relates to a door lock, in particular to a motor vehicle door lock, having a locking mechanism consisting substantially of a catch and at least one pawl, wherein both locking mechanism components are mounted on a base in a manner allowing rotation about an axis, and wherein a fixed support body is additionally provided for at least one locking mechanism component.

BACKGROUND OF DISCLOSURE

In the case of door locks, and in particular motor vehicle door locks, the locking mechanism is of particular importance as a safety-relevant component. In fact, for example, forces directed into the body must be transmitted to the body via the locking mechanism, in particular in the event of a frontal impact or of a crash in general. In fact, the locking mechanism ultimately prevents the associated motor vehicle door equipped with the door lock from popping open during such event. Most importantly, the motor vehicle door can contribute to the targeted deformation of the body. This assumes that the so-called tearing forces acting on the locking mechanism can be absorbed.

These tearing forces are generally transmitted from the locking mechanism component via its bearing surface to the fixed support body, and from there to the base. The base is usually a solid lock case that is connected to a motor vehicle door to transmit the forces. On the body itself, the power flow occurs via a locking bolt caught with the aid of the locking mechanism, which in turn is connected, for example, to a B-pillar of the motor vehicle body. Of particular importance, in addition to this force load on the bearing of the given locking mechanism component and/or its bearing surface in conjunction with the fixed support body, is particularly the low-friction operation of the locking mechanism component in question.

This is the case due to the fact that nowadays such door locks, in particular motor vehicle door locks, are often operated, in particular opened, by an electric motor. Various approaches to friction optimization have already been pursued at this point for the purpose of making the opening forces as low as possible, and allowing designs with small motors. In DE 10 2016 2015 336 A1, the locking mechanism component, and/or in the specific case the pawl, is equipped with a bearing cage.

The bearing cage for its part holds, for example, a ball or a cylinder in order to be able to provide overall rolling friction between the pawl and catch, and thereby to positively influence the friction conditions.

In the generic prior art according to DE 10 2009 029 023 A1, the pawl is equipped at this point as a rotatably mounted carrier pawl which accommodates a pawl connected to it via a joint. In this respect, the prior art already provides approaches to optimize the friction conditions between the pawl and the catch. The total operation torque required to operate the pawl as a locking mechanism component, however, not only depends on the friction between the pawl and the catch in the particular example, but is also particularly influenced by the bearing friction of the pawl against the base. At this point, there are currently no promising approaches to reduce this bearing friction.

In fact, according to DE 10 201 6 215 336 A and/or according to DE 10 2009 029 023 A1, typically and in accordance with the prior art described above, the pawl, or generally the locking mechanism component, is equipped with an opening, and plugged onto a stationary bearing pin via this opening. The opening in the locking mechanism component in question thus defines the bearing surface of the locking mechanism component, whereas the bearing pin acts as a fixed support body during a rotary movement. The bearing pin and/or fixed support body is in turn connected to the base, which is generally a lock case.

In order to reduce the bearing friction of the locking mechanism component with respect to the bearing pin and/or the fixed support body, the bearing pin and/or its radius can be reduced overall. However, the previously described strength requirements stand in the way of a smaller dimensioning of the bearing pin in this direction. This is because by reducing the diameter of the bearing bolt, a reduction in the modulus of resistance with respect to the tearing forces acting on the locking mechanism is to be expected, which is unacceptable due to the safety requirements described above. The invention aims to provide a remedy for this problem.

SUMMARY OF DISCLOSURE

The invention is based on the technical problem of further developing such a door lock, in particular a motor vehicle door lock, in such a way that the bearing friction of the locking mechanism component is reduced, but the same strength and functionality are maintained.

To solve this technical problem, a generic door lock, in particular a motor vehicle door lock, is characterized within the scope of the invention in that the locking mechanism component is designed to be rotatable around a bearing bolt in normal operation at a distance from the support body, and only in the event of a crash, when the bearing bolt is simultaneously deformed, does it come into contact with the support body.

The invention therefore initially proceeds from the knowledge that the fixed support body on the one hand, and the likewise fixed bearing pin for mounting the locking mechanism component on the other hand, are designed to be spatially and functionally separate from one another. As a result, the locking mechanism component can be designed to be at a distance from the support body in normal operation, so that it can rotate about the bearing pin. In this normal operation, the support body consequently does not interact with the locking mechanism component, thereby avoiding any disadvantages due to friction. The support body may at most act as a stop for the locking mechanism component in normal operation, as will be explained in more detail below.

Only and exclusively in the event of a crash—that is, in the event of abnormal accelerations acting on the locking mechanism of the door lock—does the interaction between the locking mechanism component and the support body occur. This is because, in the event of a crash, deformation of the bearing pin is expressly permitted, such that in the event of a crash the locking mechanism component comes into contact with the support body when the bearing pin is deformed at the same time.

Consequently, the bearing pin can be configured with a strength that is lower than in previous embodiments without additional support bodies. This is because, until now, the bearing pin in question was required to entirely absorb the tearing forces acting on it in the event of a crash.

According to the invention, in the event of a crash, the bearing pin accommodating the locking mechanism component is deformed, and the deformation of the bearing pin is accompanied by the fact that the locking mechanism component in question moves radially away from the other locking mechanism component with respect to the bearing pin, until the locking mechanism component in question comes into contact with the additionally provided support body.

The overall design in this case is such that the distance between the locking mechanism component and the support body during normal operation is smaller than a region of interaction between the two locking mechanism components. This region of interaction between the two locking mechanism components indicates how much the two locking mechanism components can move away from each other without the interaction between them being impaired or impossible. If the locking mechanism component in question, equipped with the support body, is, for example, the pawl of the locking mechanism, the region of interaction expresses the range of variance within which the pawl can interact with the catch as a further locking mechanism component to provide a locking function in an unmodified manner. This means that, within the region of interaction between the two locking mechanism components, it is ensured and guaranteed that, in the specific example, the locking mechanism maintains its closed position even in the event of a crash. This is ensured by the support body, against which the pawl moves in the event of a crash, deforming its associated bearing pin and coming into contact therewith.

In this way, the friction between the bearing pin in question and the locking mechanism component can be optimized. This is because the axis and/or the bearing pin generally passes through a hole in the locking mechanism component. The bearing pin in this case is typically configured with a diameter that is less than the material thickness of a locking mechanism arm that interacts with the other locking mechanism component. The material thickness is most commonly less than 80%, and preferably even less than 60%, of the material thickness of the locking mechanism arm which interacts with the other locking mechanism component.

In other words, compared to prior embodiments, the diameter of the bearing pin can be made particularly small, such that friction is reduced overall between the bearing pin with a small diameter and the hole of the locking mechanism component in question. The bearing friction of the locking mechanism component is thus minimized compared to previous embodiments. At the same time, all safety requirements are met because, at least in the event of a crash, the then-deformed bearing pin, in conjunction with the associated support body, ensures that the locking mechanism component in question can still interact with the other locking mechanism component, and that this interaction is also maintained. In the specific example described above, this means that the locking mechanism maintains its (main) closed position without any change, even in the event of a crash, because the pawl continues to lock the catch. As a result, an associated motor vehicle door cannot unintentionally open, such that vehicle occupants located in the motor vehicle are optimally protected in the event of a crash by protective measures in and on the motor vehicle door. This reveals the essential advantages of the invention.

According to a further advantageous embodiment, the hole of the locking mechanism component accommodating the bearing pin can have a thickening. The bearing pin is in turn fixed in or on the base and/or the lock case typically implemented at this position. The thickening can advantageously be designed as a collar surrounding the hole. The thickening and/or the collar provides a particularly effective and extensive support of the locking mechanism component in question, especially in the event of a crash. This is because, in the event of a crash, the locking mechanism component with the thickening in question and/or the collar, as a whole, comes into contact with the support body.

For this purpose, the support body advantageously has a receptacle for the thickening. The receptacle can be designed as a bearing socket adapted to the thickening. In this case, a configuration in which the bearing socket and the collar have radii that are adapted to one another is proven and tested in this case. This results in a particularly intensive and full-surface contact of the locking mechanism component on the support body in the event of a crash.

In addition, the support body can have a boom in addition to the receptacle. The boom is generally still at a distance from the locking mechanism component in the event of a crash. Most of the time, the boom acts as a stop for the pawl. That is, with the help of the boom, any opening movement of the pawl which is caused, for example, by a release lever engaging the pawl, can be limited in normal operation. Such a stop is usually also required. According to the invention, however, the support body and/or its boom assumes this function, such that special synergy effects are observed.

In order to further optimize the friction between the two interacting locking mechanism components, the locking mechanism component in question is usually equipped with a bearing element in the region of engagement with the other locking mechanism component. This bearing element can be used and designed to implement a rolling friction in this region, for example. Examples of such a bearing element are one or more balls, a cylinder, or generally a rotating body, most commonly held in a cage. As a result, the overall friction is reduced to a minimum, which improves the functionality and makes the door lock according to the invention, and in particular the motor vehicle door lock, predestined for both mechanical and electric motor operations. This reveals the essential advantages of the invention.

BRIEF DESCRIPTION OF DRAWINGS

In the following, the invention is explained in more detail with reference to a drawing showing only one exemplary embodiment. The single FIGURE shows the locking mechanism according to the invention in a schematic overview—on the one hand in normal operation (solid line), and on the other hand in the event of a crash (dashed line).

In the FIGURE, a door lock is shown. This is a motor vehicle door lock, without restrictions, which is attached inside or on a motor vehicle door, which is not shown in detail. With the aid of the motor vehicle door lock shown and to be described in more detail below, a locking bolt 1 is secured. The same is attached to the vehicle body in order to keep the motor vehicle door in the closed state, as shown in the FIGURE.

DETAILED DESCRIPTION

For this purpose, the motor vehicle door lock is equipped with a locking mechanism 2, 3 consisting substantially of a catch 2 and of a pawl 3 interacting therewith as the locking mechanism components 2, 3. In principle, however, the illustrated locking mechanism 2, 3 could also be designed as a multi-pawl locking mechanism. In this case, in addition to the one pawl 3 shown, another pawl is included; however, this is not shown. Each of the locking mechanism components 2, 3 is mounted on a base 6 in a manner allowing rotation about an axis 4, 5. The base 6 in the present case is a solid lock case. The locking mechanism 2, 3 is shown in the FIGURE in the (main) closed state.

The two axes 4, 5 are each defined by associated bearing pins 4, 5. The bearing pin 4 is a catch bearing pin 4, and the bearing pin 5 is designed as a pawl bearing pin 5. Of course, this only applies as an example, and is not to be understood as restrictive.

In the FIGURE, in addition to the two stationary bearing pins 4, 5, a fixed support body 7 is provided and implemented for at least one locking mechanism component 2, 3, specifically for the pawl 3. The fixed support body 7 is connected to the base 6. In fact, it may be the case that the fixed support body 7 is an edge of the base 6 designed as a lock case. In this case, the base 6 and the support body 7 form a single workpiece. This is of course only to be understood as an example.

According to the invention, the locking mechanism component 3, in normal operation as shown with solid lines in the FIGURE, is designed to be spaced from the support body 7 and rotatable about the associated bearing pin 5, specifically the pawl bearing pin 5. In normal operation as shown with solid lines, this corresponds to a distance A between a thickening 8 of the locking mechanism component 3, which will be described in more detail below, and the support body 7 in question. In contrast, in the event of a crash, as illustrated with dashed lines, forces F act on the motor vehicle door lock in question, and are transmitted via the locking bolt 1 to the catch 2, and finally to the pawl 3.

The forces F consequently associated with the crash act according to the exemplary embodiment in such a manner that the bearing pin 5 and/or the pawl bearing pin 5 is (slightly) deformed, specifically in the direction of the support body 7. In the case of a crash, the resulting consequence is that the locking mechanism component 3 and/or the pawl 3 in the specific example moves radially towards the support body 7, while the distance A is reduced. Whereas, accordingly, in normal operation, the locking mechanism component 3 in question is formed spaced from the support body 7 in a manner allowing rotation about the bearing pin 5 in the event of a crash, the associated forces F ensure that the locking mechanism component in question and/or the pawl 3 come to rest on the support body 7 in the specific example due to the bearing pin 5 that is deformed at the same time.

For this purpose, the bearing pin 5 and/or the pawl bearing pin 5 extends through a hole 9 in the interior of the locking mechanism component 3, defining the associated axis 5 for the locking mechanism component 3. In addition, it can be seen from the figurative illustration that the bearing pin 5 has a diameter D which is less than a material thickness S of a locking mechanism arm 10 interacting with the other locking mechanism component 2.

That means that the locking mechanism component and/or the pawl 3 is substantially configured in two parts, with the locking mechanism arm 10 on the one hand and the thickening 8 on the other hand. The thickening 8 and the locking mechanism arm 10 are designed as a single piece according to the exemplary embodiment, without restriction, and can additionally have an outer sheathing made of plastic—which, however, is cut out at least in the region of the thickening 8. On the basis of the exemplary embodiment, it can be seen that the thickening 8 is designed as a collar 8 that surrounds the bore 9.

The support body 7 for its part has a receptacle **7*a* for the collar and/or the thickening 8. For this purpose, the receptacle 7*a*, as a component of the support body 7, is designed as a bearing socket adapted to the thickening 8 and/or the collar 8. In fact, the bearing socket and/or the receptacle 7*a*, on the one hand, and the collar 8 on the other hand have radii that are adapted to one another, such that the collar 8 comes into contact in and/or on the bearing socket or the receptacle 7*a*** over a large area in the case of a crash, as shown with dashed lines.

In addition to the receptacle **7*a*, the support body 7 is also equipped with a boom 7*b*. The boom 7*b* adjoins the receptacle 7*a* in a tangential extension, specifically in a direction that delimits an opening movement of the pawl 3, which is indicated in the FIGURE. In fact, the opening movement of the locking mechanism component and/or the pawl 3 in normal operation, according to the exemplary embodiment, and starting from the (main) closed position, corresponds to the pawl 3 executing an indicated, clockwise movement around the bearing pin 5. As a result thereof, in normal operation, the catch 2 is released from the pawl 3, the same acted upon in the opening direction, and, in normal operation, can pivot open about its bearing pin 4 with the assistance of a spring in the counterclockwise direction. As a result, the previously caught locking bolt 1** is released, and an associated motor vehicle door can be opened.

The boom **7*b* can act as a stop for the pawl 3 to mechanically limit this opening movement of the pawl 3. The opening movement of the pawl 3 in normal operation is brought about, for example, via a release lever that engages the pawl 3**, and that is not shown. This can be done mechanically and manually via an inside door handle and/or outside door handle, or by an electric motor used to effect an "electrical opening".

The previously mentioned distance A between the locking mechanism component and/or the pawl 3 and the support body 7 in normal operation is selected overall in such a manner that the distance A is smaller than a region of interaction B, also shown in the FIGURE, between the pawl 3 and the catch 2. This ensures that even when the locking mechanism component and/or the pawl 3 are in contact with the support body 7 and there is no longer any distance A, the pawl 3 still engages with the catch 2 and provides a locking function, such that the locking mechanism 2, 3 maintains its illustrated (main) closed position even in the event of a crash. As a result, the vehicle occupants are optimally protected, because, due to the locking bolt 1, which is still caught, the associated motor vehicle door cannot open unintentionally. Protective devices provided at this position can consequently implement their intended action.

Finally, in the FIGURE, a bearing element 11 is also provided in the engagement region between the two locking mechanism components 2, 3. According to the exemplary embodiment, the bearing element 11 is mounted in and/or on the pawl 3. In principle, however, the bearing element 11 can also be arranged in or on the catch 2 in the engagement region, and/or in the illustrated region of interaction B between the two locking mechanism components 2, 3. It can also be contemplated that the bearing element 11 is implemented on both locking mechanism components 2, 3 in the region of interaction B. In any case, this also reduces the friction between the two locking mechanism components 2, 3, because the bearing element 11 typically provides rolling friction in this area.

| List of reference symbols | |
|---|---|
| 1 locking bolt | |
| 2,3 locking mechanism (locking mechanism component) | 2 catch<br>3 pawl |
| 4,5 axis | 4 bearing pin<br>5 pawl bearing pin |
| 6 base | |
| 7 fixed support body | 7a receptacle<br>7b boom |
| 8 thickening | 8 surrounding collar |
| 9 bore | |
| 10 locking mechanism arm | |
| 11 bearing element | |
| A distance | |
| B region of interaction | |
| D diameter | |
| F force | |
| S material thickness | |

The invention claimed is:

1. A door lock for a motor vehicle door, the door lock comprising:

a locking mechanism including a catch and a pawl, wherein both the catch and the pawl are mounted on a base to allow rotation about an axis; and a fixed support body for the pawl, wherein the pawl in normal operation is configured to be spaced apart from the fixed support body to allow rotation about a bearing pin, and only comes into contact with the fixed support body in a crash when the catch and the pawl are in an engaged position and the bearing pin is deformed at a same time, wherein the fixed support body is positioned such that the pawl maintains engagement with the catch in the crash when the pawl contacts the fixed support body, and wherein the fixed support body has a receptacle shaped for receiving at least a portion of the pawl in the crash, wherein a distance between the pawl and the fixed support body in the normal operation is smaller than a region of interaction between the catch and the pawl.

2. The door lock according to claim 1, wherein the bearing pin which extends through a bore in the pawl has a diameter which is less than a material thickness of a locking mechanism arm which interacts with the catch.

3. The door lock according to claim 2, further comprising a thickening which surrounds the bore.

4. The door lock according to claim 3, wherein the thickening is formed as a collar which surrounds the bore.

5. The door lock according to claim 3, wherein the receptacle is shaped for the thickening.

6. The door lock according to claim 5, wherein the receptacle is formed as a bearing socket adapted to the thickening.

7. The door lock according to claim 5, wherein the receptacle and the thickening have radii adapted to one another.

8. The door lock according to claim 5, wherein the fixed support body has, in addition to the receptacle, a boom which is spaced apart from the pawl, and which acts as a stop for the pawl.

9. The door lock according to claim 1, wherein the pawl has, in a region of engagement with the catch, at least one bearing element for implementing a rolling friction.

* * * * *